(12) United States Patent
Fujiwara

(10) Patent No.: US 7,242,498 B2
(45) Date of Patent: Jul. 10, 2007

(54) JOB EXECUTING SYSTEM AND JOB EXECUTING METHOD

(75) Inventor: Akihiko Fujiwara, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 713 days.

(21) Appl. No.: 10/006,618

(22) Filed: Dec. 10, 2001

(65) Prior Publication Data

US 2003/0107758 A1   Jun. 12, 2003

(51) Int. Cl.
 *G06F 15/00* (2006.01)
 *G06F 3/00* (2006.01)
 *G06F 17/00* (2006.01)
 *H04N 1/00* (2006.01)

(52) U.S. Cl. .................. 358/1.16; 715/700; 715/764

(58) Field of Classification Search ............... 358/1.15, 358/1.16, 1.14, 402, 1.1; 379/100.08; 345/594; 715/700, 764; 700/100
See application file for complete search history.

(56) References Cited

U.S. PATENT DOCUMENTS

| | | | | |
|---|---|---|---|---|
| 5,872,569 A | * | 2/1999 | Salgado et al. | 715/764 |
| 6,065,857 A | * | 5/2000 | Hazama et al. | 700/95 |
| 6,587,861 B2 | * | 7/2003 | Wakai et al. | 715/500 |

OTHER PUBLICATIONS

U.S. Appl. No. 09/456,014, filed Dec. 7, 1999.
U.S. Appl. No. 09/537,728, filed Mar. 30, 2000.

* cited by examiner

*Primary Examiner*—King Y. Poon
*Assistant Examiner*—Thomas J. Lett
(74) *Attorney, Agent, or Firm*—Foley & Lardner LLP

(57) ABSTRACT

A job executing system in which, with respect to a same processing object DC1, designated jobs are executed in sequence, includes: a job management unit for managing input-related job JB11 which executes chiefly input processing and output-related jobs which chiefly executes output processing; and a job synthesizing unit for generating a synthetic job B (DC1, JB11, JB12) constituted by an input-related job which has been already executed, and an output-related job which will be executed hereafter.

16 Claims, 9 Drawing Sheets

Template settings

|   | Template Name | Device Name | Cooperate Mode | Function |
|---|---|---|---|---|
| 1 | TWAIN Private | A1 | - | Scan to TWAIN |
| 2 | File Share Private | A1 | - | Scan to File |
| 3 | Cooperate Scan | A1 | Var-1 | Scan to Doc.Handling |
|   |   |   |   |   |

FIG.7
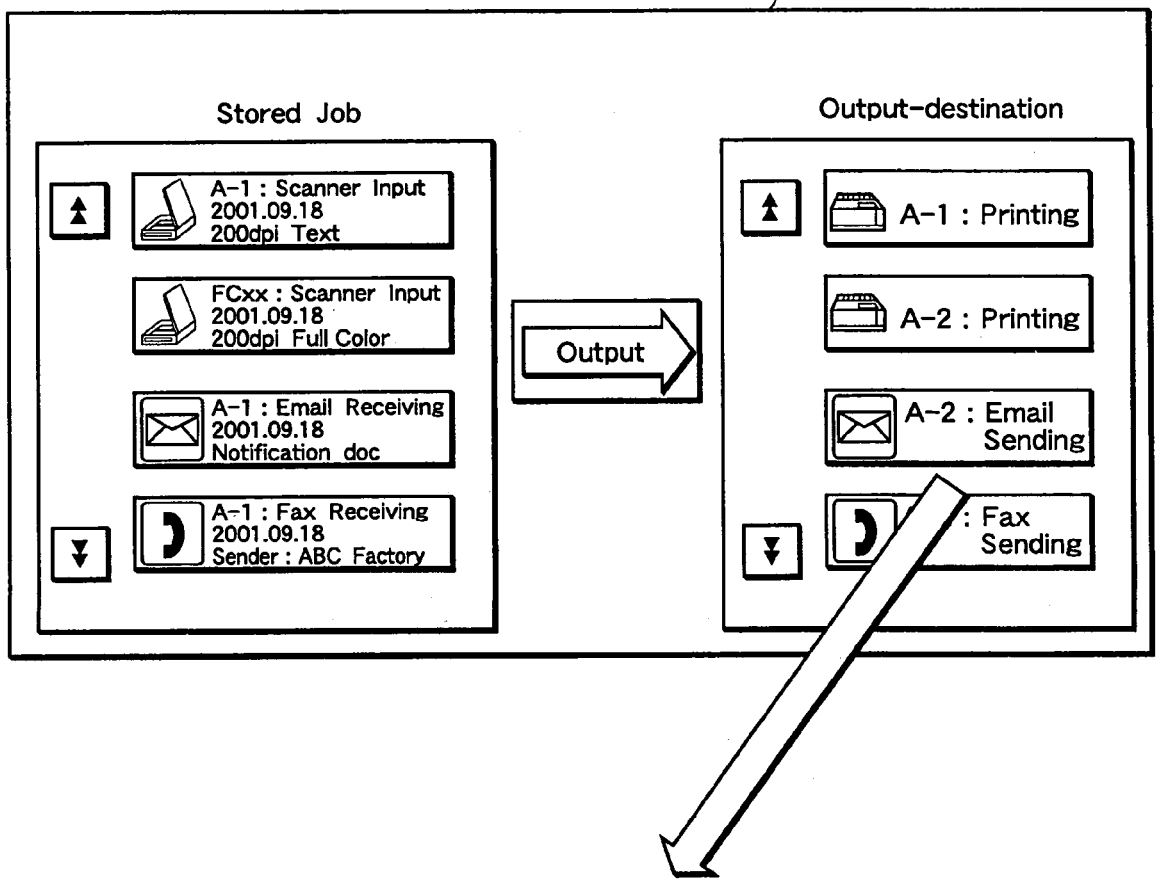
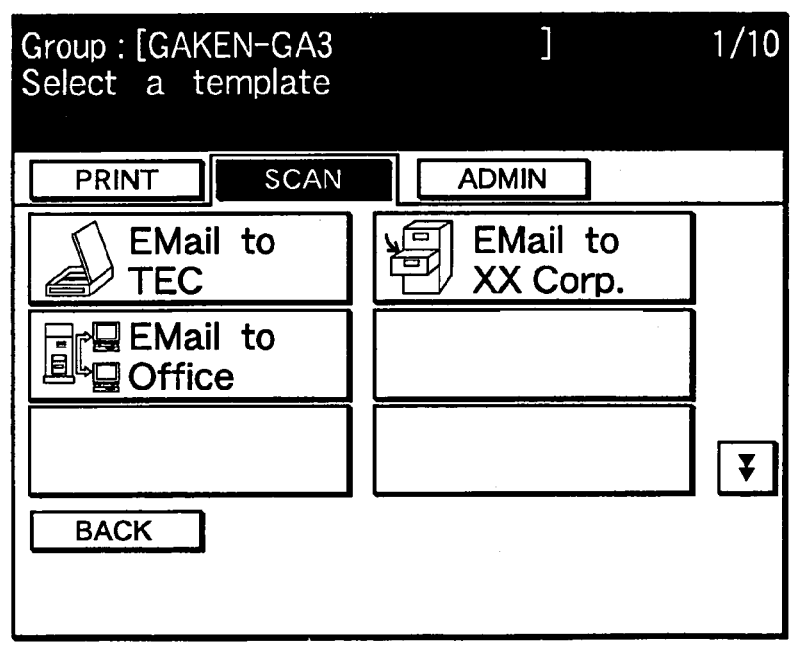

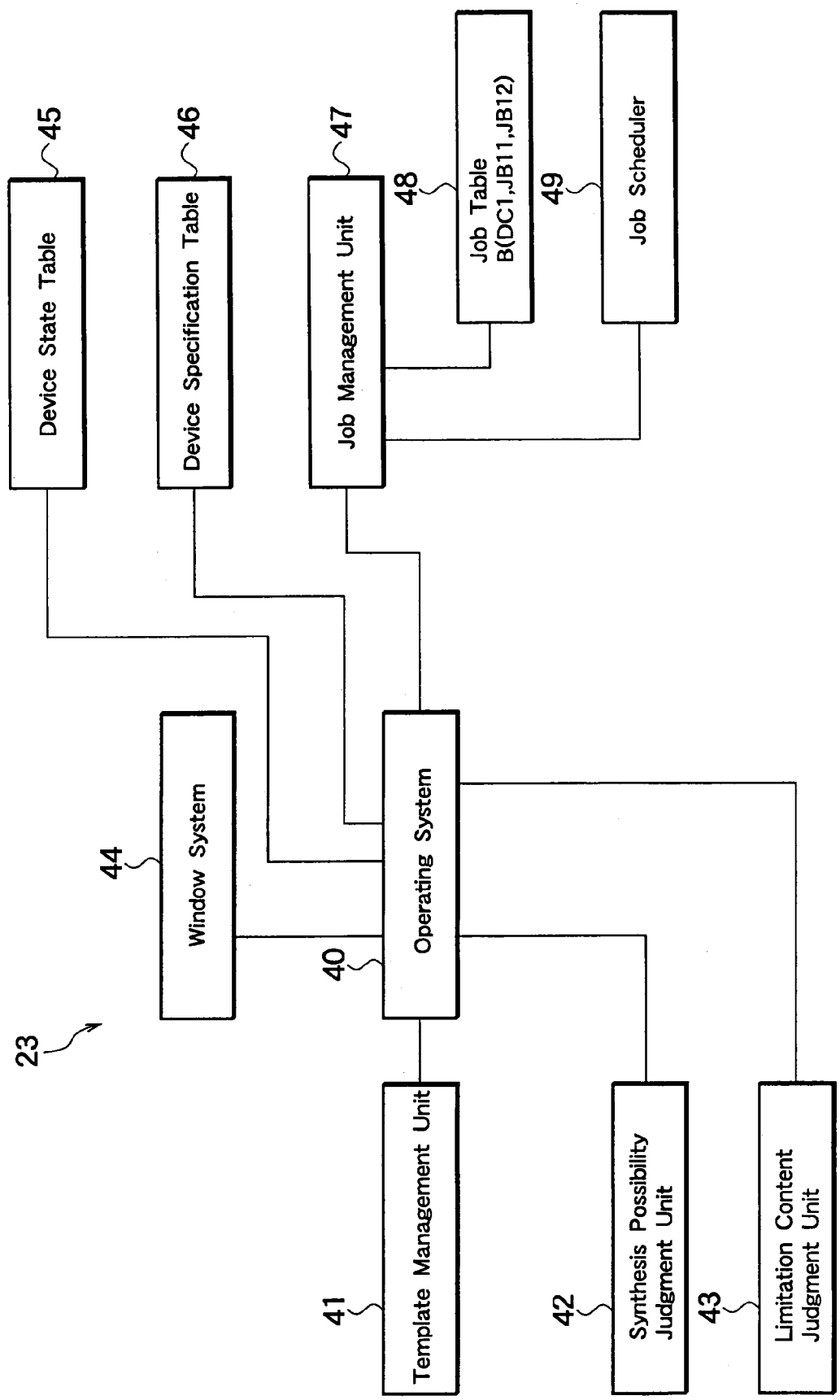

JOB EXECUTING SYSTEM AND JOB EXECUTING METHOD

BACKGROUND OF THE INVENTION

1. Field of the Invention

The present invention relates to a job executing system and a job executing method, each of which is preferably applicable to a case where an input-related job and an output-related job are associated with each other, for example, when a document is input or output via a network.

2. Description of Related Art

In conventional art, when the user intends to perform a work by means of jobs related to input or output of a document, he activates software or the like having a function suitable for the work each time the job is performed.

For example, when the user intends to obtain a received electronic mail, he takes out a received electronic mail from the mail box using a mailer and causes the electronic mail to be displayed. When he intends to print the content of the body of the electronic mail thus obtained or the content of an attached file, he newly activates print processing.

In this example, each of the taking-out, displaying, and printing, of the electronic mail is a separate and independent job, so that, when each job is terminated, the job disappears completely. Therefore, before performing each job, he does not need to mind what the previous job was. Accordingly, he can interactively proceed with his desired processing by performing operations to instruct executions of subsequent jobs one by one.

However, when, with respect to one document, jobs, such as the taking-out, displaying, and printing, of an electronic mail, are performed as jobs which are unrelated to and independent of one another, it may happen that the information on what the preceding job (or, a further preceding job) was becomes unknown or disappears completely.

Such detailed historical information on previous jobs is useful, for example, for accurately forecasting a result of a job intended to be executed hereafter, performing detailed job management, and preventing unexpected malfunctions.

In many conventional file systems, a configuration is adopted in which information indicative of a type of a file, and information indicative of dates and times when the file is generated, altered, and referenced are stored as file management information in association with its file name. However, such a conventional configuration is problematic because what file management information is stored depends on the file system and because the file management information is not necessarily sufficient.

SUMMARY OF THE INVENTION

In view of the above-mentioned problem, the present invention is accomplished to achieve an object to provide a job executing system and a job executing method in which information on jobs which are executed in a time series with respect to a same processing object is used to enhance reliability of the job executing system and a job executing method, and to conduct detailed job management.

A first aspect of the present invention provides a job executing system in which, with respect to a same processing object, designated jobs are executed in a time series, comprising:

job management means for managing an input-related candidate job which executes chiefly input processing, and an output-related candidate job which executes chiefly output processing; and job synthesizing means for generating, according to a user's operation, a synthetic job constituted by an input-related candidate job which has been already executed, and an output-related candidate job which will be executed hereafter.

A second aspect of the present invention provides a job executing method in which, with respect to a same processing object, designated jobs are executed in a time series, comprising:

managing an input-related candidate job which executes chiefly input processing, and an output-related candidate job which executes chiefly output processing; and generating, according to a user's operation, a synthetic job constituted by an input-related candidate job which has been already executed, and an output-related candidate job which will be executed hereafter.

BRIEF DESCRIPTION OF THE DRAWINGS

FIG. 7 is a schematic view showing how the screen display changes in the embodiment of the present invention;

FIG. 9 is a schematic view showing an internal configuration of a control unit which is provided inside the multi function peripheral or the like in the embodiment of the present invention.

MOST PREFERRED EMBODIMENT OF THE INVENTION

Hereinafter, a most preferred embodiment of a job executing system and a job executing method according to the present invention will be described with reference to the attached drawings.

Figure 5:
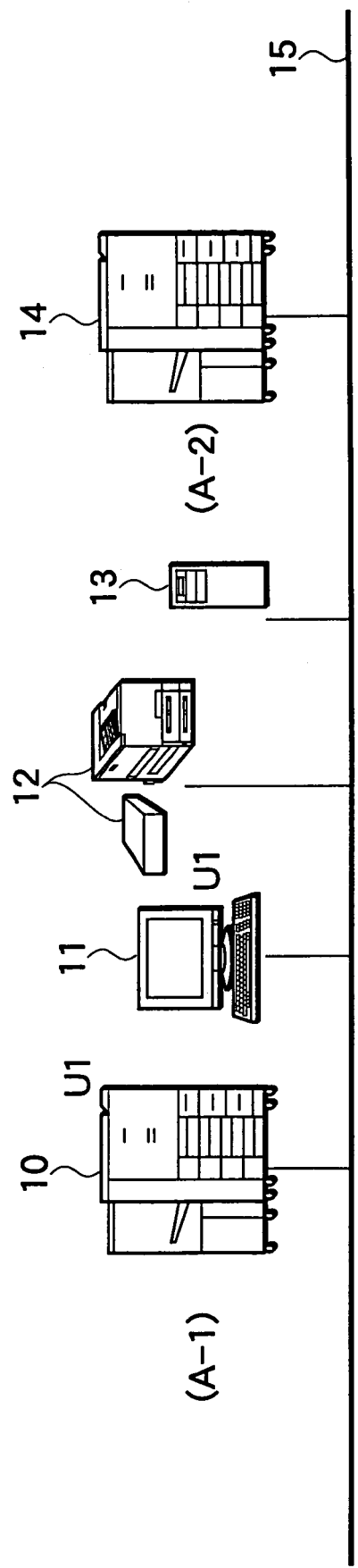
FIG. 5 is a schematic view showing an overall configuration of the embodiment of the present invention.

In FIG. 5 showing the overall configuration of the job executing system according to the present embodiment, communication devices 10 to 14, each of which has an information processing function, are connected to a same transmission line 15 so as to constitute one network.

The communication devices 10 to 14, exhibiting various types, include: multi function peripherals (MFP) 10 and 14, each of which has two or more functions out of the functions of a copy machine, a facsimile machine, a printer, and so on; a personal computer 11; and a server 13, which is a SMTP/POP (Simple Mail Transfer Protocol/Post Office Protocol) server or a server having a single function such as document storage.

Even where two or more communication devices are of the same type (for example, multi function peripherals 10 and 14), they do not need to have the same functional specification.

Note that the communication devices 10 to 14 have a common communication protocol so that they can communicate with one another.

While the communication devices 10 to 14 within the job executing system of the present embodiment vary in type as mentioned above, they can be classified into two categories: One category is an input/output device which can input and output data existing on paper. The multi function peripherals 10 and 14 fall under this category. The other category is a communication device which lacks the functions of inputting and outputting data existing on paper but which can input and output only electronic data via the transmission line 15. The personal computer 11, document processing device 12, and server 13 fall under this category.

Not to mention, each of the multi function peripherals 10 and 14 has, in addition to the functions of inputting and outputting data existing on paper, functions of inputting and outputting electronic data via the transmission line 15.

Figure 1:
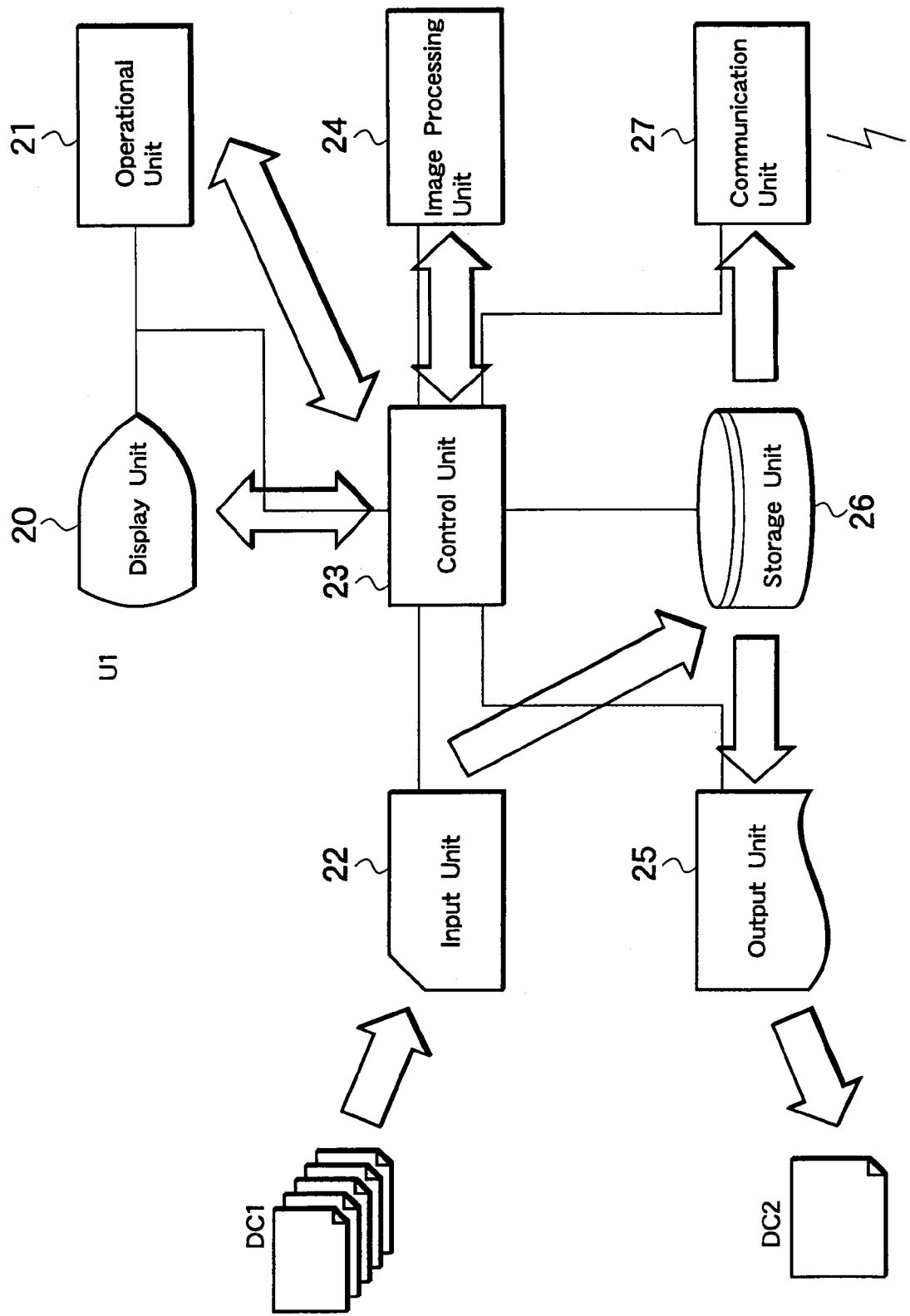
FIG. 1 is a schematic view showing an internal configuration of a multi function peripheral or the like according to an embodiment of the present invention.

Each of the communication devices 10 to 14 basically has an internal configuration as shown in FIG. 1, so that the internal configurations of all the communication devices 10 to 14 can be expressed at least by FIG. 1. The following descriptions will be made assuming that FIG. 1 shows chiefly the internal configuration of the multi function peripheral 10.

As shown in FIG. 1, the multi function peripheral 10 includes a display unit 20, an operation unit 21, an input unit 22, a control unit 23, an image processing unit 24, an output unit 25, a storage unit 26, and a communication unit 27.

Among these members, the display unit 20 is a unit which provides a graphical user interface (GUI) to the user U1, who operates the multi function peripheral 10. The display unit 20 is often constituted using a liquid crystal display function or the like in a case of multi function peripherals. If the concerned communication device is not a multi function peripheral 10 but a personal computer 11 or the like, the display unit 20 may be constituted by a color display (bit mapped display) of approximately 17 inches.

Although the GUIs provided in the multi function peripherals of this embodiment are not necessarily the same as GUIs provided in ordinary personal computers, the GUIs of the multi function peripheral can be classified into a category of a GUI. Specifically, the GUIs of the multi function peripherals are not a character user interface (CUI) through which chiefly a command or parameter is input by one character at a time. Instead, the GUI of the multi function peripheral 10 is a graphical user interface which employs many graphics as shown in, for example, FIG. 6. Accordingly, the GUIs provided in the multi function peripherals of the present embodiment can be classified into the category of GUI.

The operational unit 21 is a unit which is operated by the user U1 in a GUI environment. The operational unit 21 can be constituted by a touch panel, a mechanical button, or the like. In the case of a touch panel, the operational unit 21 is constituted as a member which is integral with the display unit 20 when viewed from the user U1. If the concerned communication device is not a multi function peripheral but a personal computer 11 or the like, the operational unit 21 is often constituted by a keyboard, a mouse, a track ball, or the like.

The control unit 23 is a unit which corresponds to a central processing unit (CPU) in terms of hardware, and to an operating system (OS) in terms of software. In the case where the concerned communication device is an office automation (OA) machine such as the multi function peripheral 10, the OS is often realized as a real time OS which ensures an upper bound (i.e., a longest time) of a processing time or response time because, in OA machines, it is necessary to perform processing within a predetermined time limitation. Also, the control unit 23 includes a control program for a job management unit 47 (see FIG. 9) as later described, or the like The control unit 23 further includes a mechanical controller function of actuating a mechanical mechanism which is indispensable to a scanner portion of the multi function peripheral 10 (i.e., an optical input unit serving as a part of a copy machine or facsimile machine).

The communication unit 27 is a unit which is connected to the transmission line 15 and establishes communication with another communication device (for example, the server 13, multi function peripheral 14, and the like, when viewed from the multi function peripheral 10) by providing various types of interfaces while using the communication protocol. Concrete examples of such interfaces include: a telephone line connecting function such as a facsimile interface; and various LAN (Local Area Network) interfaces, such as a function of receiving a printing job from the personal computer 11, functions of transmitting and receiving an electronic mail, and a file sharing function via the transmission line 15.

In the case where the concerned communication device is not the multi function peripheral 10 but a personal computer 11 or the like, a function of transmitting a print request (for example, a client function (i.e., a function of being a client) of a printer via a LAN interface) is provided in the communication unit 27. Even in the case of the multi function peripheral 10, the communication unit 27 may include the client function because it may happen that the multi function peripheral 10 serves as a client of the printer function of another multi function peripheral (for example, the multi function peripheral 14).

The input unit 22 is a unit which receives input of a document DC1. The scanner portion of the multi function unit 10 applies to the input unit 22. The term "document" as used herein refers to a group of data. In the case of the multi function peripheral 10 having a scanner portion capable of optically reading data existing on a manuscript of paper (hereinafter, referred to as "paper manuscript"), the document DC1 can take the form of a paper manuscript consisting of a plurality of sheets.

Note that, even in the case where the concerned communication device is the multifunction peripheral 10, if the multi function peripheral 10 receives electronic data (e.g., an electronic mail) from another communication device connected to the transmission line 15, the electronic data received via the communication unit 27 serves as the document DC1. Where the concerned communication device is a communication device other than a multi function peripheral 10 and 14, that is, the personal computer 11 or the like, the document DC1 is restricted to electronic data such as an electronic mail because the functions provided in the communication device are not sufficient for accepting input of a paper manuscript.

When the input unit 22 receives the document DC1 in the form of an electronic mail, the input unit 22 needs to have a mailer.

The storage unit 26, which temporarily stores the document DC1 input from the input unit 22, has a primary memory such as a RAM (random access memory), and also may have a secondary memory such as a hard disk. In this physical configuration, the document DC1 is usually stored in a file, which serves as a logical storage unit. The file system, which conducts management and processing of the file, is realized as a part of the OS.

The image processing unit 24 is constituted by, for example, an image compression module, and may have, as necessary, a function of executing processing related to an image, such as a function of transforming a data form related to the image. In the situation where the document DC1, which is to be transmitted to another communication device of transmission-destination (i.e., destination of transmission), contains image data and where the document DC1 (image data) is too large for the receiving ability of the communication device of transmission-destination or for the transmission ability of the transmission line 15, the image compression module can execute image compression to the document DC1 (image data) so as to reduce the size of the data to be transmitted.

The output unit 25 is a unit which outputs a document DC2. Similarly to the document DC1, the document DC2 to be output can take both the forms of paper and electronic data in the case of the multi function peripheral 10 having a printer function or a copy function as print-outputting means, while the document DC2 to be output is restricted only to electronic data in the case of a personal computer 11 or the like. Accordingly, when the document DC2 is output in the form of paper, the output portion of the printer function or copy function applies to the output unit 25, while when the document DC2 is output in the form of, for example, an electronic mail serving as electronic data, a mailer applies to the unit 25.

Next, an internal configuration of the control unit 23 will be described. The internal configuration of the control unit 23 is as shown in FIG. 9.

In FIG. 9, the control unit 23 includes an OS 40, a template management unit 41, a synthesis possibility judgment unit 42, a limitation content judgment unit 43, a window system 44, a device state table 45, a device specification table 46, a job management unit 47, a job table 48, and a job scheduler 49.

The OS 40 corresponds to, for example, the above-mentioned real time OS.

The window system 44, which corresponds to the display unit 20 and the operating unit 21, provides the GUI to the user U1. In the case where the concerned communication device is the multi function peripheral 10, the window system 44 controls to display a plurality of windows for showing the user U1 different information, for example, on a liquid crystal display screen of the liquid crystal display function serving as the display unit 20. Also, the window system 44 has a function of providing a unit which the user U1 operates, such as the touch panel and the like.

While a window system of an ordinary personal computer such as the personal computer 11 is usually so configured that the user can flexibly designate a location, a dimension, etc. of the respective windows on the display screen; the window system 44 of a multi function peripheral 10 does not require such flexibility as required in ordinary personal computers.

The device state table 45 is a table which stores device state information in such a manner that the device state information is associated with its corresponding communication device. Here, device state information indicates a device state of each of the communication devices which are connected to the multi function peripheral 10 via the transmission line 15. The physical substance of the table 45 is data which exists on a hard disk or the like of the storage unit 26. While various types of information can be used for the device state information, it is assumed here that is failure information indicative of whether or not a failure occurs is stored as the device state information.

As a way of storing the device state information into the device information table 45, a way can be mentioned in which the user U1 or the like stores the information by performing a predetermined operation. However, there is a more convenient way in which the information is automatically stored according to a result of communication conducted among the communication devices 10 to 14 via the transmission line 15. For example, if a request signal has been transmitted to the multi function peripheral 14 but no response is returned therefrom even after elapse of a predetermined period of time, or if such a transmission are repeated predetermined number of times but no response is returned therefrom to any of the transmissions; a judgment is made that a failure occurs at the multi function peripheral 14, and the device state information (failure information) of the multi function peripheral 14 is automatically changed from "no failure exists" to "a failure exists".

Alternatively, the recognition of the occurrence of a failure may be conducted using a SNMP (Simple Network Management Protocol) management tool.

The device specification table 46 is a table which stores device specification information in such a manner that the device specification information is associated with its corresponding communication device. Here, the device specification information indicates a device specification of each of the communication devices which are connected to the multi function peripheral 10 via the transmission line 15. Similarly to the device state table 45, the physical substance of the device specification table 46 is data which exists on the hard disk or the like of the storage unit 26.

An arrangement of the communication devices 10 to 14 connected to the transmission line 15 is usually changed dynamically by disconnecting some of them or by connecting additional new devices according to the user's convenience or the like. Therefore, it will be convenient if the automatic storing via communication is enabled as to the device specification information as in the case of the device state information. To realize the automatic storing of the device specification information, it is necessary to provide, in each of the communication devices 10 to 14 itself, a function of transmitting the device specification information via the transmission line 15. If this function is not provided, the user U1 or a maintenance person needs to store the information by conducting a predetermined operation.

The job management unit 47 is a unit which has, under its control, a job table 48 and a job scheduler 49, and conducts management of job processing. A job is a unit of work, viewed from the user U1. For example, each of the above-mentioned taking-out, displaying, and printing, of an electronic mail constitutes one job.

While there are many types of jobs for the above reason, processing of every job proceeds, in principle, according to the following series of job steps S1 to S8: preparing input data (S1), starting (S2), controlling execution wait (S3), allocating resources (S4), execution (S5), releasing resources (S6), output (S7), and termination (S8).

Concrete contents of each job (e.g., the name of a program, and the type or characteristic of an input or output file, which are used for the job) can be described in, for example, the job control language (JCL).

Usually, a kernel, which constitutes the core of the OS 40, generates many tasks with respect to one job, which is generated in accordance with an event such as an operation by the user U1, and conducts task management including scheduling of these tasks. All the tasks generated in connection with one job correspond to "execution" of the job step S5. A task is a unit of work for the OS (kernel) 40.

Since a job is too large as a unit of work for an ordinary OS (e.g., the OS 40), it is necessary to provide the job management unit 47, which is a control program specific for controlling a job.

Further, jobs process different objects according to their features. For example, in the case of a job which executes numerical calculation, the object to be processed is numerical data which is given thereto. In this embodiment, it is assumed that, as an object to be processed, a document such as the document DC1 is given to a job.

The job table 48 is a table which manages jobs by associating each of the jobs with a document to be processed by the job. Jobs executed in the present embodiment are different from jobs executed in batch processing in the following respects: In the case of batch processing, a plurality of jobs are executed sequentially with respect to one object; while, in the present embodiment, in the state in which an input-related job has been already completed, a next output-related job is executed. On the other hand, the jobs of the present embodiment are common to the jobs in batch processing in that, with respect to one object, there are a plurality of jobs. It can be understood that, in the present embodiment, there are virtual synthetic jobs of the same number as the number of the combinations of an input-related job and an output-related job.

The term "input-related job" as used herein refers to a job which chiefly executes input processing viewed from the communication device (for example, multi function peripheral 10). By contrast, the term "output-related job" as used herein refers to a job which chiefly executes output processing viewed from the communication device. For example, in the case where the multi function peripheral 10 receives an electronic mail, the receiving of the electronic mail is an input-related job. By contrast, in the case where the content of a received electronic mail is print-output, the print-outputting is an output-related job. The term "print-output" as used herein refers to an action of output in the form of printing, throughout the specification of this application.

As an example, it is assumed here that two jobs JB 11 and JB 12 are stored (preserved) in such a manner that the two jobs are associated with one document of a document DC1. These three elements (i.e., document DC1, job JB11, and job JB12) are constituent elements of the synthetic job, so that the synthetic job can be expressed as B (DC1, JB11, JB12).

While the jobs JB11 and JB12 to be executed in the synthetic job may be executed on the same communication device (for example, the multi function peripheral 10), it is assumed here that the jobs JB11 and JB12 are executed on different communication devices for the following reason: Functional specifications of each communication device are limited, so that a situation may be brought about in which the job 11 can be executed only on the multi function peripheral 10 while the job JB 12 can be executed only on the multi function peripheral 14. In such a situation, the necessity for conducting succession of a synthetic job between different communication devices arises not a little. Such necessity arises, for example, in the following case: In the situation where the user U1 has received the document DC1 via an electronic mail at the multi function peripheral 10 and wishes to print-output the document DC1 in A3 size at the multi function peripheral 10; the multi function peripheral 10 has only a function of print-outputting in A4 size, while the function of print-outputting in A3 size is provided only in the multi function peripheral 14.

In this case, at the multi function peripheral 10, the job JB11 is executed to the document DC1 to eventually obtain an intermediate-state document JB11(DC1), which is an interim result in the entire process regarding the synthetic job. Then, the intermediate-state document JB 11 (DC1) is succeeded via the transmission line 15 to the multi function peripheral 14. At the multi function peripheral 14, the job JB12 is executed to the intermediate-state document JB11 (DC1) to obtain a final-state document JB 12 (JB 11 (DC1)), which is a final result in the entire process regarding the synthetic job.

The job scheduler 49 is a unit which manages scheduling of executions conducted at the respective job steps of each job. Accordingly, when the synthetic job B (DC1, JB11, JB12) is processed, the job scheduler 49, which serves as a job scheduler for the multi function peripheral 10, manages the scheduling of the respective job steps of the job JB11. In addition to this management, the job scheduler 49 needs to also manage the succession of the synthetic job to the multi function peripheral 14 in order to complete the processing of the synthetic job. Along with the succession of the synthetic job, the management of the execution scheduling of the synthetic job is also succeeded to the job scheduler (49) of the multi function peripheral 14, which is succession-destination (i.e., destination of succession) of the synthetic job.

The synthetic job B (DC 1, JB 11, JB 12) may be deleted from the job table 48 immediately after the succession is completed. Alternatively, the synthetic job B (DC1, JB11, JB12) may be left on the job table 48 until the multi function peripheral 14 informs completion of the synthetic job via the transmission line 15. This is because it may happen that a failure suddenly occurs at the multi function peripheral 14 and that the sudden failure hinders the synthetic job from being completed.

Note that the number of the synthetic jobs stored concurrently on the job table 48 is not restricted to one, but the number is, in general, two or more, and accordingly the stored synthetic jobs constitute a queue. This is because the occurrence of a job at the multi function unit 10 (including occurrence of a synthetic job) is caused not only by operating the multi function peripheral 10 but also by receiving a request which is sent from the personal computer 11 via the transmission line 15.

In an ordinary job management, when one job with respect to an object is terminated (S8), the job disappears. By contrast, in the present embodiment, even after an input-related job with respect to an object is terminated, the job does not disappear; and instead the job is kept stored in the job table 48 while being kept in an intermediate state (for example, intermediate-state job B (DC1, JB11)) where designation of an output-related job (for example, job JB12) is awaited.

Figure 3:
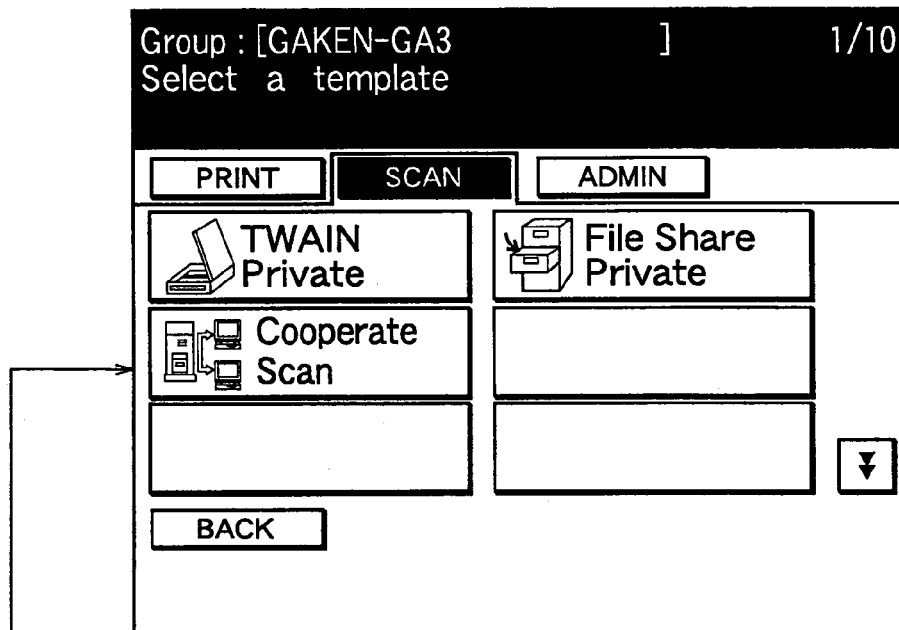
FIG. 3 is a schematic view showing a template which is used in the embodiment of the present invention.

The template management unit 41 is a unit which accumulates and manages a plurality of standard attributes (standard software interface and its setting information) related to the jobs for scanners or printers as a template as shown in, for example, FIG. 3. If each template is so configured as to be displayed on the display unit 20 as an icon as shown in, for example, FIG. 3 via the window system 44, the user U1, who has recognized the template instinctively, can operate the icon, for example, by touching the touch panel, so that he can easily select an attribute related to the job.

The synthesis possibility judgment unit 42 is a unit which judges whether or not a functional specification of a communication device of a succession-destination of a synthetic job can cope with the succession, and which references the device specification table 46 when this judgment is made. For example, assuming that print-outputting is desired at a succession-destination, if a communication device (for example, personal computer 11) intended to be selected as the succession-destination does not have a printer function, a negative judgment result is obtained that the intended communication device cannot cope with the succession. On the contrary, if the communication device has a printer function, a positive judgment result is obtained that the communication device can cope with the succession, regardless of what functional specification the printer function has.

Figure 8:
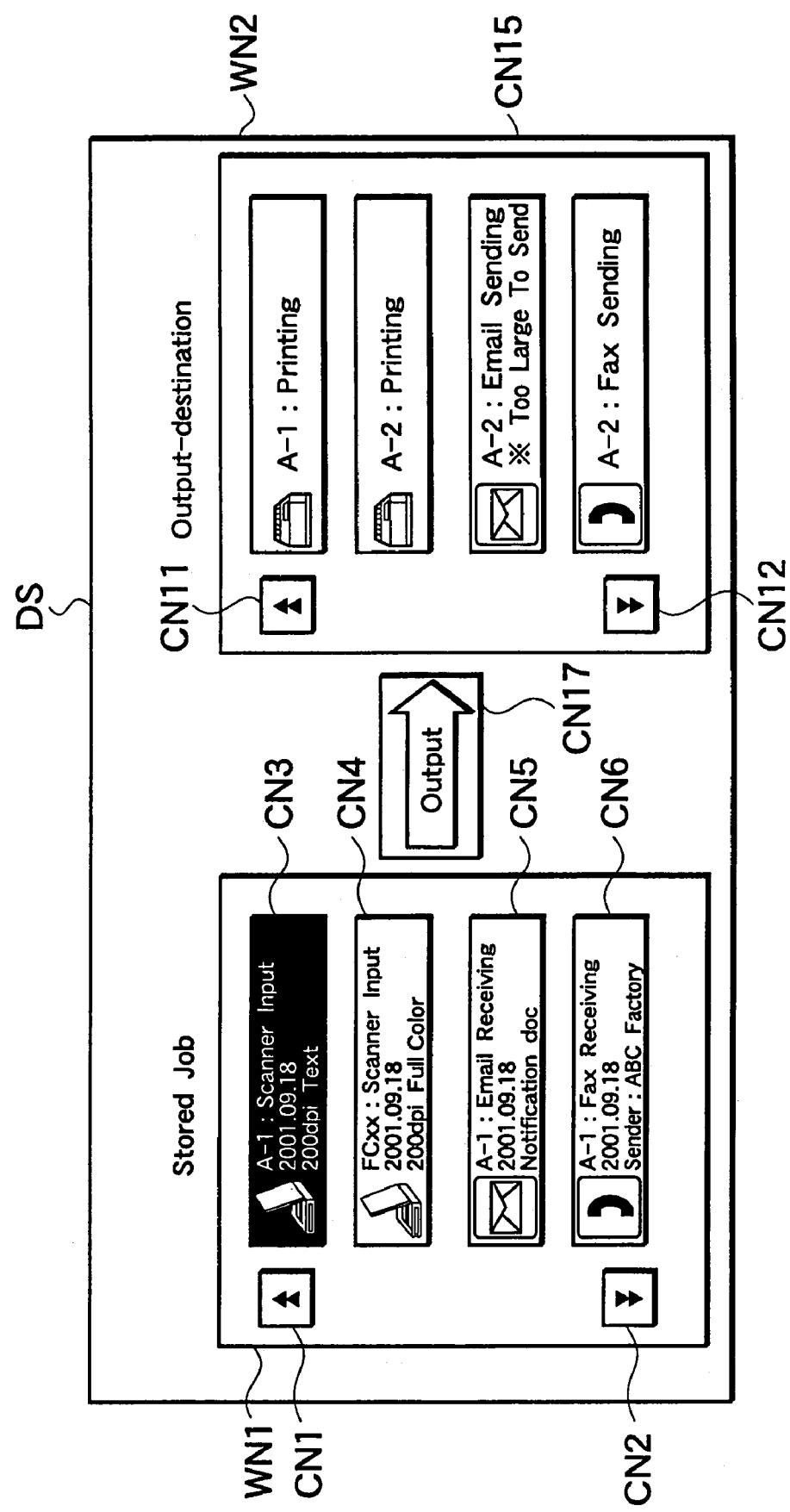
FIG. 8 is a schematic view showing an example of screen display in the embodiment of the present invention.

The judgment result is obtained at the synthesis possibility judgment unit 42, as necessary, display-output at the display unit 20, for example, in the form of character information (see the inside of CN 15 in FIG. 8). The term "display-output" as used herein refers to an action of output in the form of display, throughout the specification of this application.

The limitation content judgement unit 43 is a unit which functions when the synthesis possibility judgment unit 42 makes a positive judgment, and which judges the content of a limitation imposed at the time of conducting a succession of a synthetic job. The judgment at the limitation content judgement unit 43 is needed, for example, in the following case: Although print-outputting in B5 size is desired at a succession-destination; a communication device (for example, multi function peripheral 14) which is intended to be selected as a succession-destination does not have a function of printing in B5 size, and instead the communication device can conduct only print-outputting in A4 and A3 sizes. A content of a limitation, which is output as a judgment result, is, as necessary, display-output, for example, in the form of character information by the display unit 20, as in the case of the synthesis possibility judgment unit 42.

Figure 4:
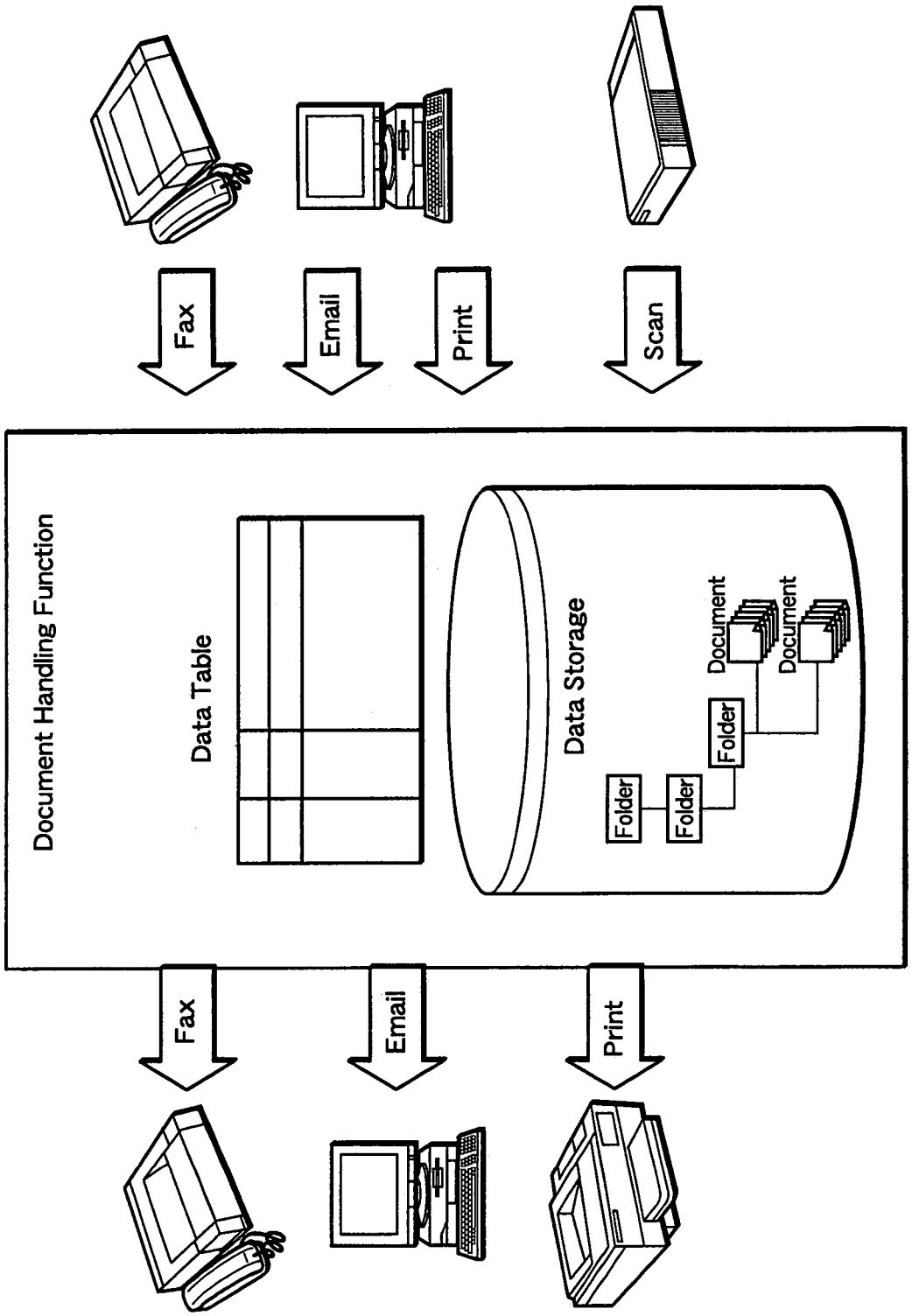
FIG. 4 is a schematic view illustrating operations in document handling according to the embodiment of the present invention.

The above-mentioned members including the template management unit 41, the synthesis possibility judgment unit 42, the limitation content judgment unit 43, the window system 44, the device state table 45, the device specification table 46, the job management unit 47, the job table 48, and the job scheduler 49 realize a document handling function of handling a document (for example, the document DC1) as shown in FIG. 4.

In FIG. 4, the data table is a portion which corresponds to, for example, the template management unit 41 or job table 48, and the data storage is a portion which corresponds to the storage unit 26 or the file system.

Next, operations of the job executing system according to the present embodiment having the above-mentioned configuration will be described.

While the user U1 can cause, via the transmission line 15, the multi function peripheral 10 or the like to execute jobs including a synthetic job by operating the personal computer 11, the explanations of the operations of the present embodiment will be made by employing the above-mentioned case: In the situation in which the user U1 has received the document DC1 via an electronic mail at the multi function peripheral 10 and wishes to print-output the document DC1 in A3 size; the multi function peripheral 10 (having a mailer) has only a function of print-outputting in A4 size, while the function of print-outputting in A3 size is provided only in the multi function peripheral 14 (having no mailer).

More specifically, in this case, the electronic mail was transmitted from any one of the communication devices provided inside the job executing system or from a communication device provided outside the system, and has reached the SMTP/POP server 13. Also, the user U1 wishes, after confirming the content of the electronic mail by using the personal computer 11 (or the display unit 20 of the multi function peripheral 10), to print-output the whole of the electronic mail in A3 size. However, among the two multi function peripherals provided inside the job executing system, the multi function peripheral 10, which has a mailer, does not have a function of printing in A3 size, while the multi function peripheral 14, which has a function of printing in A3 size, does not have a mailer.

If the multi function peripheral 14 would have a mailer, succession of a synthetic job would not be needed, because the user's desire is attained only by causing the multi function peripheral 14 to receive the electronic mail and to print-output the received job. However, in this case, succession of a synthetic job is needed.

Even where both of the multi function peripherals 10 and 14 have a mailer, succession of a synthetic job is needed in the following case: In the situation in which the multi function peripherals 10 and 14 are located remote from each other, and in which the user U1 is standing beside the multi function peripheral 10 and another user is standing beside the multi function peripheral 14; the user U1 wishes to pass a print-output resultant to the other user.

Figure 6:
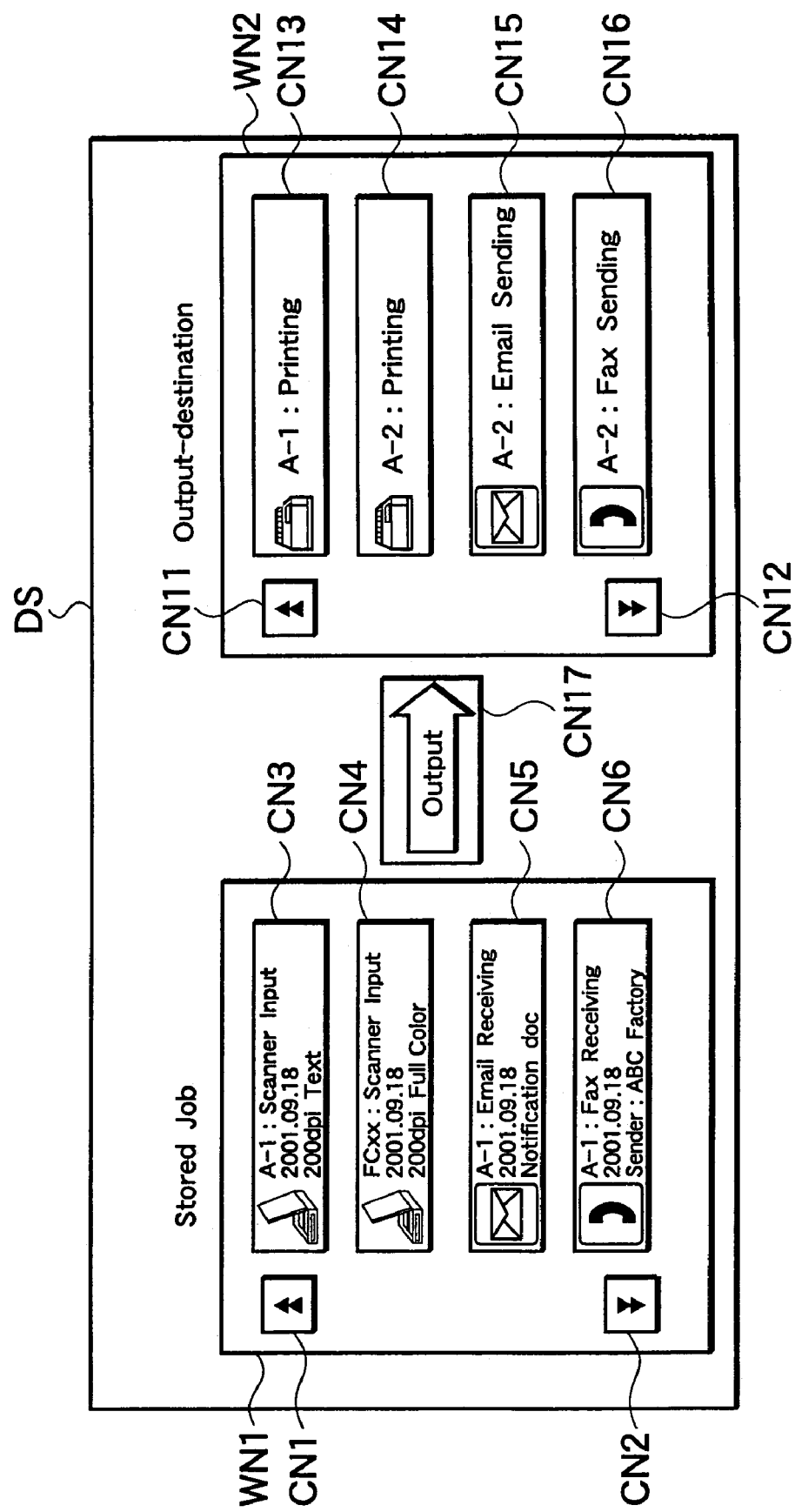
FIG. 6 is a schematic view showing an example of screen display according to the embodiment of the present invention.

In the above-mentioned two cases where succession of a synthetic job is needed, if the user U1 performs a predetermined operation to the operational unit 21 of the multi function peripheral 10 to call processing of outputting the job (e.g., the intermediate-state job B (DC1, JB 11)) stored in the job table 48, the screen as shown in FIG. 6 is displayed on the display screen DS of the display unit 20 of the multi function peripheral 10. Where the multi function peripheral 10 is shared by many and unspecified users, the predetermined operation may contain an operation for authentication of the user U1.

FIG. 6 shows an example of a screen which corresponds to the touch panel. With the screen configuration shown in FIG. 6, the user U1 can select any one of the four icons CN3 to CN6, arranged vertically inside the window WN1, by touching the upward button CN1 or the downward button CN2. Similarly, the user U1 can select any one of the four icons CN 13 to CN 16, arranged vertically inside the window WN1, by touching the upward button CN1 or the downward button CN2.

Each time the upward button CN1 or CN 11 is pressed, a selected icon moves upward in each window. On the contrary, each time the downward button CN2 or CN12 is pressed, a selected icon moves downward in each window. If the shade or color of each icon (CN3 in the case of FIG. 8) is changed depending on whether or not the icon is selected as shown, for example, in FIG. 8, the user U1 can confirm, by observation with his eyes, what icon is selected.

Usually, a stored job is firstly selected and then an output-destination (i.e., succession-destination) is selected. Alternatively, as necessary, the system may be so configured that an output-destination is firstly selected and then a stored job is selected. In this configuration, it is preferred that the character information corresponding to the judgment results obtained at the synthesis possibility judgment unit 42 and limitation content judgment unit 43 is displayed on the side of the icons CN3 to CN6 each indicative of a stored job.

The button CN17, which is disposed between the left window WN1 and right window WN2, is used when the user U1 designates, after selections of the stored job and its output-destination are completed, execution of output processing.

The state in FIG. 6, in which the four icons CN3 to CN6 exist within the left window WN1 indicative of stored jobs, shows that four stored jobs exist for the user U1.

If the icon CN5, which is located third counted from above, is assumed to correspond to the above-mentioned intermediate-state job B (DC1, JB11), the user U1 selects the icon CN5.

Next, when any of the icons CN13 to CN16 disposed inside the right window WN2 is selected, the synthesis possibility judgment unit 42 and the limitation content judgment unit 43 in the multi function peripheral 10 are activated, so that, as necessary, character information according to the judgment result obtained thereat is displayed in the vicinity of the selected icon. The displayed icon enables the user U1 to intuitively know the judgment result on whether or not the selected output-destination has been accepted, or on what limitation is imposed on the output-destination.

If the character information shows that a negative judgment result is obtained at the synthesis possibility judgment unit with respect to a job, the user U1 sees the character information and can cancel the execution of the job. Further, the system can be easily so configured that, when the user U1 carelessly overlooks the character information of the negative judgment and attempts to forcibly execute the job, the multi function peripheral 10 hinders the user's forcible attempt and gives a warning. Thus, detailed job management and prevention of unexpected malfunctions are enabled.

Further, if a template stored in the template management unit 41 is associated with each of the icons CN 13 to CN 16 each indicative of an output-destination, the attributes of the job (JB 12) executed at a communication device of an output-destination (in this case, the multi function peripheral 14) can be easily set, as shown in FIG. 7. Accordingly, it is possible for the user U1 to cause the multi function peripheral 14 to execute his desired print-outputting in A3 size.

When the intermediate-state document (JB11 (DC1)), serving as an interim result, is intended to be transmitted from the multi function peripheral 10 to the multi function peripheral 14, various types of communication protocols can be used. For example, if the multi function peripheral 14 has a mailer; it is possible to use SMTP (Simple Mail Transfer Protocol), or alternatively to use the same protocol as is used when the personal computer 11 serves as a client of print-output processing.

In FIG. 6, the symbol A-1 denotes the multi function peripheral 10 itself, and the symbol A-2 denotes the multi function peripheral 14. Accordingly, for the transmission to the multi function peripheral 14 of the output-destination, when the SMTP (Simple Mail Transfer Protocol) is intended to be used, the icon CN15 in FIG. 6 is selected, while when the protocol used communication device is intended to be used as the client of the print-output processing, the icon CN 14 is selected.

The icon CN 13 is used for the case where the multi function peripheral 10 itself executes print-output processing, while the icon CN 16 is used for the case where facsimile transmission is conducted to the multi function peripheral 14.

As is clearly known from the above descriptions, according to the present embodiment, it is possible to reliably store the information regarding the previous job without depending on a file system.

Owing to this configuration, the reliability of the job executing system can be enhanced, and detailed job management can be performed.

Note that, although in the above-mentioned embodiment the number of jobs constituting a synthetic job is two, the number may be three or more. A synthetic job constituted by three or more jobs can be generated by sequentially connecting synthetic jobs each consisting of two jobs.

The present invention is superior to the conventional file system in terms of practical application. Specifically, if management items similar to the stored contents of the job table 48 is provided as file management information in a file system, the same advantages as those of the present invention may be obtained. However, to realize this, it is necessary to develop a file system, so that it becomes necessary to develop a new operating system (OS). Development of a new OS unfavorably requires a very large number of developing steps. In contrast, in the present invention, the above-mentioned advantages can be obtained only by using a conventional OS (that is, a conventional file system) as it is.

Figure 2:
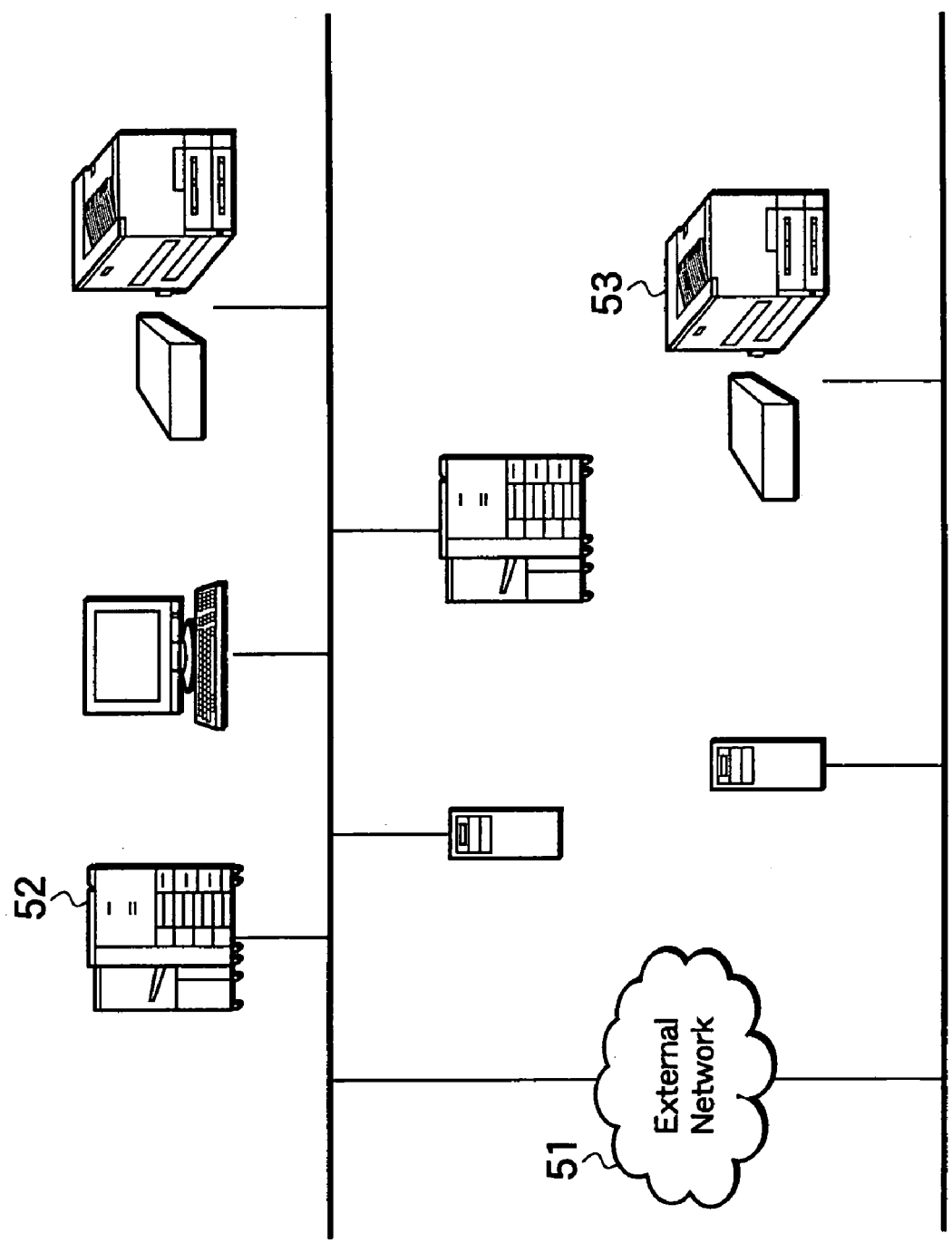
FIG. 2 is a schematic view showing an overall structure of a modification of the embodiment of the present invention.

In the above-mentioned embodiment, the communication devices are connected to one transmission line 15 so as to be included within one LAN (that is, within one collision domain). However, the present invention is applicable the case where plural communication devices are scattered in plural different collision domains interconnected via routers, switching hubs, or the like. As shown in FIG. 2, the present invention is further applicable to the case where an external network such as the Internet exist between communication devices (for example, between the devices 52 and 53).

Further, as necessary, the unit which corresponds to the storage unit 26 or the image processing unit 24 may be provided in a storage server provided in the Internet.

What is claimed is:

1. A job executing system in which, with respect to a same processing object, designated jobs are executed in a sequence, comprising:

job management means for managing an input-related candidate job which executes chiefly input processing, and an output-related candidate job which executes chiefly output processing;

job synthesizing means for generating, according to a user's operation, a synthetic job constituted by an input-related candidate job which has been already executed by a first device, and an output-related candidate job which will be executed hereafter; and job schedule succeeding means for succeeding, only after the first device has executed the input-related candidate job, a schedule of the synthetic job generated from the first device to a second device when the second device which has yet to execute the output-related candidate job and the first device which has executed the input-related candidate job are different in the synthetic job, wherein the job schedule succeeding means includes a job table which stores the synthetic job, and wherein the synthetic job is maintained in the job table until the synthetic job is completed, and only then is the synthetic job deleted from the job table.

2. The job executing system according to claim 1, in which a graphical user interface environment is provided, wherein there is provided screen displaying means for displaying, on a screen, interactive figure elements each indicative of its associated candidate job; and according to user's operations to some of the interactive figure elements, their associated candidate jobs are synthesized so as to obtain a synthetic job.

3. The job executing system according to claim 2, wherein
when the number of the input-related candidate jobs is two or more, the input-related candidate jobs are associated with their respective input means; and
when the number of the output-related candidate jobs is two or more, the output-related candidate jobs are associated with their respective output means.

4. The job executing system according to claim 2, wherein
there is provided standard setting information management means for accumulating and managing standard output setting information indicative of a standard attribute of the output-related candidate job; and
according to a user's operation, the synthetic job thus obtained is executed while using the standard output setting information.

5. The job executing system according to claim 3, in which, by means of user's operations to interactive figure elements, selection of an interactive figure element indicative of an input-related candidate job and selection of an interactive figure element indicative of an output-related candidate job are sequentially conducted to generate a synthetic job, wherein
there is provided synthesis possibility judging means for judging, on the basis of a relationship between a characteristic of the input means thus associated and a characteristic of the output means thus associated, whether or not a synthesis can be conducted between an input-related or output-related job which has been already selected, and an output-related or input-related job which is intended to be selected by a user's operation; and
when the synthesis possibility judging means judges that the synthesis cannot be conducted, a change is made to a display of the interactive figure element indicative of the output-related or input-related candidate job which is intended to be selected.

6. The job executing system according to claim 3, in which, by means of user's operations to interactive figure elements, selection of an interactive figure element indicative of an input-related candidate job and selection of an interactive figure element indicative of an output-related candidate job are sequentially conducted to generate a synthetic job, wherein
there is provided a limitation content examining means for examining, on the basis of a relationship between a characteristic of the input means thus associated and a characteristic of the output means thus associated, a content of a limitation imposed when a synthesis is conducted between an input-related or output-related candidate job which has been already selected, and an output-related or input-related candidate job which is intended to be selected by a user's operation; and
according to an examination result made by the limitation content examining means, a change is made to a display of the interactive figure element indicative of the output-related or input-related candidate job which is intended to be selected.

7. The job executing system according to claim 3, in which, by means of user's operations to interactive figure elements, selection of an interactive figure element indicative of an input-related candidate job and selection of an interactive figure element indicative of an output-related candidate job are sequentially conducted to generate a synthetic job, wherein
based on an operating state of the output means, a change is made a display of the interactive figure element indicative of the output-related or input-related candidate job, which is intended to be selected by a user's operation.

8. A job executing system in which, with respect to a same processing object, designated jobs are executed in a sequence, comprising:
job management means for managing an input-related candidate job which executes chiefly input processing, and an output-related candidate job which executes chiefly output processing;
job synthesizing means for generating, according to a user's operation, a synthetic job constituted by an input-related candidate job which has been already executed by a first device, and an output-related candidate job which will be executed hereafter; and
job schedule succeeding means for succeeding, only after the first device has executed the input-related candidate job, a schedule of the synthetic job generated from the first device to a second device when the second device which has yet to execute the output-related candidate job and the first device which has executed the input-related candidate job are different in the synthetic job,
wherein, in a case where the synthetic job has not completed due to a problem in execution of the output-related candidate job by the second device, the synthetic job is reexecuted by having the first device re-perform the input-related candidate job and then having the second device re-attempt to perform the output-related candidate job.

9. A job executing method in which, with respect to a same processing object, designated jobs are executed in a sequence, comprising:
managing an input-related candidate job which executes chiefly input processing, and an output-related candidate job which executes chiefly output processing;
executing an input-related candidate job by a first device;
generating, according to a user's operation, a synthetic job constituted by the input-related candidate job which has been already executed by the first device, and an output-related candidate job which will be executed after the generating step;
succeeding, only after the first device has executed the input-related candidate job, a schedule of the synthetic job generated from the first device to a second device when the second device which has yet to execute the output-related candidate job and the first device which has executed the input-related candidate job are different in the synthetic job;
storing the synthetic job in a job table which stores the synthetic job;
maintaining the synthetic job in the job table until the synthetic job is completed; and
after the synthetic job is completed, deleting the synthetic job from the job table.

10. The job executing method according to claim 9, in which a graphical user interface environment is provided, wherein
there is provided a step of displaying, on a screen, interactive figure elements each indicative of its associated candidate job; and
according to user's operations to some of the interactive figure elements, their associated candidate jobs are synthesized so as to obtain a synthetic job.

11. The job executing method according to claim 10, wherein
when the number of the input-related candidate jobs is two or more, the input-related candidate jobs are associated with their respective input means; and
when the number of the output-related candidate jobs is two or more, the output-related candidate jobs are associated with their respective output means.

12. The job executing method according to claim 10, wherein
there is provided a step of accumulating and managing standard output setting information indicative of a standard attribute of the output-related candidate job; and
according to a user's operation, the synthetic job thus obtained is executed while using the standard output setting information.

13. The job executing method according to claim 11, in which, by means of user's operations to interactive figure elements, selection of an interactive figure element indicative of an input-related candidate job and selection of an interactive figure element indicative of an output-related candidate job are sequentially conducted to generate a synthetic job, wherein
a judgment is made, on the basis of a relationship between a characteristic of the input means thus associated and a characteristic of the output means thus associated, as to whether or not a synthesis can be conducted between an input-related or output-related job which has been already selected, and an output-related or input-related job which is intended to be selected by a user's operation, and
when a judgment that the synthesis cannot be conducted is made, a change is made to a display of the interactive figure element indicative of the output-related or input-related candidate job which is intended to be selected.

14. The job executing method according to claim 11, in which, by means of user's operations to interactive figure elements, selection of an interactive figure element indicative of an input-related candidate job and selection of an interactive figure element indicative of an output-related candidate job are sequentially conducted to generate a synthetic job, wherein
there is provided a step of examining, on the basis of a relationship between a characteristic of the input means thus associated and a characteristic of the output means thus associated, a content of a limitation imposed when a synthesis is conducted between an input-related or output-related candidate job which has been already selected, and an output-related or input-related candidate job which is intended to be selected by a user's operation; and
according to an examination result made at the step, a change is made to a display of the interactive figure element indicative of the output-related or input-related candidate job which is intended to be selected.

15. The job executing method according to claim 11, in which, by means of user's operations to interactive figure elements, selection of an interactive figure element indicative of an input-related candidate job and selection of an interactive figure element indicative of an output-related candidate job are sequentially conducted to generate a synthetic job, wherein,
based on an operating state of the output means, a change is made to a display of the interactive figure element indicative of the output-related or input-related candidate job which is intended to be selected by a user's operation.

16. A job executing method in which, with respect to a same processing object, designated jobs are executed in a sequence, comprising:
managing an input-related candidate job which executes chiefly input processing, and an output-related candidate job which executes chiefly output processing;
executing an input-related candidate job by a first device;
generating, according to a user's operation, a synthetic job constituted by the input-related candidate job which has been already executed by the first device, and an output-related candidate job which will be executed after the generating step; and
succeeding, only after the first device has executed the input-related candidate job, a schedule of the synthetic job generated from the first device to a second device when the second device which has yet to execute the output-related candidate job and the first device which has executed the input-related candidate job are different in the synthetic job,
wherein, in a case where the synthetic job has not completed due to a problem in execution of the output-related candidate job by the second device, the method comprising:
reexecuting the synthetic job by having the first device re-perform the input-related candidate job and then having the second device re-attempt to perform the output-related candidate job.

* * * * *